Nov. 6, 1923.  
J. KLEPPER ET AL  
CLUTCH  
Filed May 20, 1921

1,473,564

WITNESSES  
W. G. Jones  
A. L. Kitchin

INVENTORS  
J. KLEPPER  
C. KLEPPER  
BY  
Munn & Co  
ATTORNEYS

Patented Nov. 6, 1923.

1,473,564

UNITED STATES PATENT OFFICE.

JOSEPH KLEPPER AND CHARLES KLEPPER, OF BROOKLYN, NEW YORK.

CLUTCH.

Application filed May 20, 1921. Serial No. 471,066.

*To all whom it may concern:*

Be it known that we, JOSEPH KLEPPER and CHARLES KLEPPER, both citizens of the United States, and residents of the city of New York, borough of Brooklyn, in the county of Kings and State of New York, have invented a new and Improved Clutch, of which the following is a full, clear, and exact description.

This invention relates to clutches and has for an object to provide an improved clutch for connecting a driving shaft with a driven shaft.

Another object of the invention is to provide a clutch which may be slidingly mounted on a driving shaft and act to connect the driving shaft with the driven shaft.

A further object, more specifically, is to provide a clutch in which a driving gear is connected with the casing at one end while the casing at the opposite end is hollowed for receiving interlocking clutch members.

In the accompanying drawing—

Figure 1:
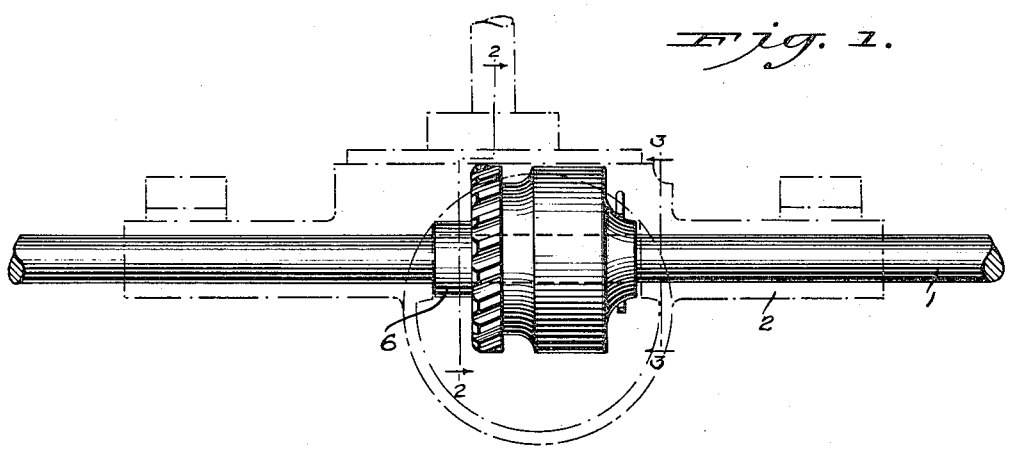
Figure 1 is a side view of a clutch disclosing one embodiment of the invention, the same being shown in connection with a driving shaft and part of a vacuum sweeper.
Figure 2:
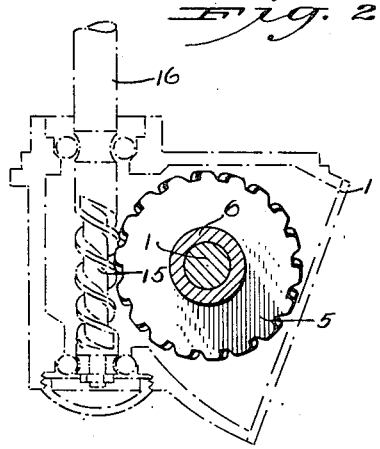
Figure 2 is a sectional view through Figure 1 approximately on line 2—2.
Figure 3:
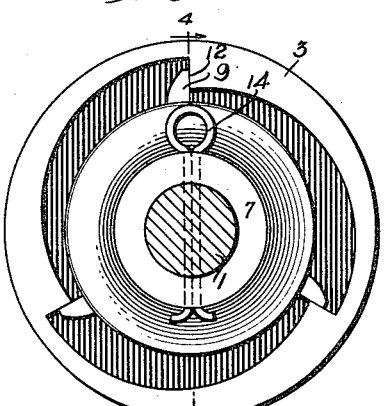
Figure 3 is a sectional view through Figure 1 on line 3—3, the same being on an enlarged scale.

Referring to the accompanying drawing by numerals, 1 indicates a drive shaft and 2 a clutch housing, said clutch housing being shown in dots as it forms no part of the present invention though indicating how the clutch may be used. This housing 2 and shaft 1 form part of a vacuum sweeper especially adapted to use the clutch though it will be evident that the clutch may be used for a large number of other purposes and with a different kind of a sweeper without departing from the spirit of the invention. The clutch is provided with a housing 3 formed integral with the body 4, which body is also provided with a worm drive gear 5. The body 4 is loosely mounted on shaft 1 and is held against longitudinal movement in one direction by a suitable collar 6 while in the opposite direction it is held against longitudinal movement by the spider 7. This spider is provided with a number of sockets 8 into which the ends of the respective clutch pawls 9 extend, said pawls being pivotally mounted and held in place by suitable pins 10.

Figure 5:
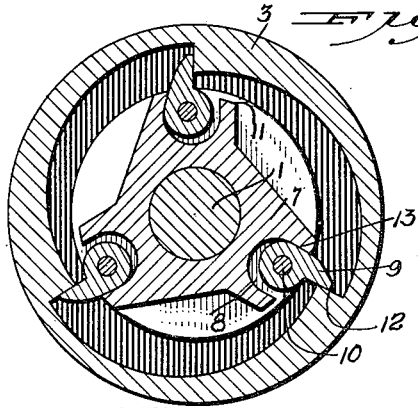
Figure 5 is a sectional view through Figure 4 on line 5—5.
Figure 4:
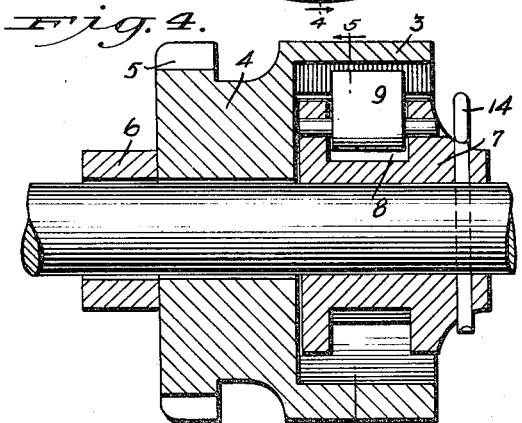
Figure 4 is a sectional view through Figure 3 on line 4—4.

From Figure 5 it will be noted that the spider 7 is cut away at points 11 so that the pawls may rest thereon when the pawls move in a reverse direction. The pawls 9 are adapted to co-act with the shoulders 12 formed as projections in the casing 3. Only three shoulders 12 and three pawls 9 are shown but it will be evident that a greater or a less number may be used without departing from the spirit of the invention.

The respective pawls rest against the respective shoulders 12 when in operative position as shown in Figure 5 and when in an inoperative position rest against the cut away portions 11. In order to connect the spider 7 with shaft 1, a pin 14 is used though some other connection may be provided if desired. The shaft 1 is driven from any suitable source and when rotated will rotate the spider 7 and cause the pawls 9 to move into engagement with the shoulders 12 whereupon casing 3 will be rotated together with the body 4 and gear 5. The gear 5 meshes with a suitable worm 15 connected with shaft 16. This shaft is a driven shaft and may be part of the vacuum sweeper or any other machine.

The operation of the device is as follows: Upon the shaft 1 being rotated in one direction, the pawls 9 actuated by gravity and centrifugal force engage the shoulders 12, thereby rotating the clutch member 3. If the shaft 1 is rotated in the opposite direction, the pawls 9 disengage from the shoulders 12 and swing downwardly against the shoulders 11 of spider 7 and thereby the spider 7 rotates free of clutch member 3.

What we claim is:—

In a clutch, the combination with a driving shaft, of a driven member and a driving member, the driven member comprising a gear body loosely mounted on the shaft and recessed at one end to form a housing, the inner periphery of said housing having three symmetrically disposed inclined wall sections terminating at one end in flat radial shoulders, the driving member comprising a spider rigidly mounted on said shaft, said spider including a hub and three radial symmetrically disposed spokes each having an outwardly opening radial socket one wall of which is shorter than the opposite wall and presenting a shoulder at its outer end, a tapering radial pawl pivoted in each of said sockets, said pawls having one face flat to engage the radial shoulders of the housing to turn the same when the spider is turned in one direction, the opposite faces of said pawls being curved and adapted to engage upon the inclined wall sections of the housing to swing them against the shorter wall of the radial sockets when turned in the opposite direction to permit them to pass adjacent shoulders and drop by gravity in front of the respective radial shoulders of the housing wall section.

JOSEPH KLEPPER.
CHARLES KLEPPER.